(12) United States Patent
Morozumi et al.

(10) Patent No.: US 7,678,469 B2
(45) Date of Patent: Mar. 16, 2010

(54) DECORATIVE SHEET, FORMED PRODUCT AND TRANSPORTATION APPARATUS

(75) Inventors: Naohiro Morozumi, Shizuoka (JP); Yasuo Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 255 days.

(21) Appl. No.: 11/749,958

(22) Filed: May 17, 2007

(65) Prior Publication Data

US 2007/0269635 A1 Nov. 22, 2007

(30) Foreign Application Priority Data

May 22, 2006 (JP) ............... 2006-142072

(51) Int. Cl.
*B32B 3/00* (2006.01)
*B32B 7/02* (2006.01)
*B32B 15/00* (2006.01)
*B32B 15/08* (2006.01)
*B60R 13/00* (2006.01)

(52) U.S. Cl. ............ 428/542.2; 428/31; 428/126; 428/204; 428/207; 428/215; 296/1.08; 296/181.2

(58) Field of Classification Search ............ 428/126, 428/172, 212, 204, 207, 542.2, 31, 215; 296/1.08, 296/181.2
See application file for complete search history.

(56) References Cited

U.S. PATENT DOCUMENTS

| 2003/0124254 A1 | 7/2003 | McCoy et al. |
| 2005/0112330 A1 | 5/2005 | Suzuki et al. |

FOREIGN PATENT DOCUMENTS

| EP | 0949120 A1 | 10/1999 |
| JP | 08-230127 A | 9/1996 |
| JP | 2004-224036 A | 8/2004 |
| JP | 2004-250581 A | 9/2004 |
| JP | 2005-153351 A | 6/2005 |
| WO | 94/03337 A2 | 2/1994 |
| WO | 00/51798 A1 | 9/2000 |
| WO | 00/51799 A1 | 9/2000 |
| WO | 00/51829 A2 | 9/2000 |
| WO | 02/00448 A2 | 1/2002 |

OTHER PUBLICATIONS

Suzuki et al.: "Decorative Sheet, Decorated Formed Product, Method of Making the Decorative Sheet and Method of Making the Decorated Formed Product," U.S. Appl. No. 12/336,639, filed on Dec. 17, 2008.

Yasuo Suzuki et al.; "Decorative Sheet, Decorated Molded Article, and Motor Vehicle"; U.S. Appl. No. 11/718,646, filed May 4, 2007.

(Continued)

*Primary Examiner*—Donald Loney
(74) *Attorney, Agent, or Firm*—Keating & Bennett, LLP

(57) ABSTRACT

A decorative sheet that may be attached to a surface of an object includes a base member, which has first and second opposed principal surfaces; a protective layer, which is arranged over the first principal surface of the base member; and a coloring layer, which is arranged either over the second principal surface of the base member or between the base member and the protective layer and which includes a pigment. The protective layer has a thickness of about 30 μm to about 60 μm and includes about 1.4 wt % to about 4.0 wt % of UV absorbent material. The coloring layer has a thickness of about 15 μm to about 80 μm and includes about 1.0 wt % to about 4.0 wt % of UV absorbent material.

6 Claims, 9 Drawing Sheets

OTHER PUBLICATIONS

Yasuo Suzuki et al.; "Decorative Sheet, Molded Article, Motor Vehicle, and Production Method of Molded Article"; U.S. Appl. No. 10/972,168, filed Oct. 22, 2004.

Yasuo Suzuki et al.; "Process for Production of Moldings and Motor Vehicles"; U.S. Appl. No. 11/718,651, filed May 4, 2007.

Naohiro Morozumi et al.; Decorative Sheet, Formed Product and Transporation Apparatus'; U.S. Appl. No. 11/749,953, filed May 17, 2007.

Yasuo Suzuki et al.; "Decorative Sheet, Molded Article, and Motor Vehicle Provided With the Same"; U.S. Appl. No. 10/509,369, filed Sep. 28, 2004.

Official communication issued in the counterpart European Application No. 07010159.7, mailed on Sep. 13, 2007.

DECORATIVE SHEET, FORMED PRODUCT AND TRANSPORTATION APPARATUS

BACKGROUND OF THE INVENTION

1. Field of the Invention

The present invention relates to a decorative sheet to be stretched and attached onto the surface of an object, and also relates to a formed product and a transportation apparatus decorated with such a decorative sheet.

2. Description of the Related Art

Various formed products are used as exterior members for a transportation apparatus such as a car. Those formed products have been decorated by painting in many cases. A painted exterior member should have weather resistance and damage resistance that are high enough for the product to withstand long-term usage outdoors.

To provide sufficient weather resistance and damage resistance to an exterior member, a "top coating" technique is often adopted in the field of car painting. According to the top coating technique, the uppermost surface of a painted exterior member is coated with an acrylic resin or a fluorine resin, for example, thereby increasing its weather resistance and damage resistance.

Meanwhile, it was recently proposed that a decorative sheet be attached to the surface of a formed product as a technique of decorating a formed product as disclosed in Japanese Laid-Open Patent Publication No. 2005-153351. FIG. 9 shows an example of the decorative sheet. The decorative sheet 110 shown in FIG. 9 includes a base member 1 of a resin material and a decoration layer 2 formed on the principal surface 1a of the base member 1 by printing a pattern on that surface 1a with ink, for example. By attaching this decorative sheet 110 to the surface of the body 121 of a formed product in the order shown in FIGS. 10A, 10B and 10C with an adhesive 8 applied on the decoration layer 2, a formed product 120 with a decorated surface can be obtained.

The formed product 121 shown in FIG. 10A includes a hemispherical (cuplike) raised portion 121a and therefore has a rugged surface. For that reason, the decorative sheet 110 being attached is stretched so as to follow such ruggedness perfectly. To stretch the decorative sheet 110 just as intended, the decorative sheet 110 is typically heated and softened before being attached.

A formed product with a decorative sheet can be recycled more easily than a formed product with a painted surface. In addition, a decorated product can have a different type of fine appearance from that of a painted product. That is why a decorative sheet contributes to improving the appearance of formed products noticeably. For these reasons, a method using a decorative sheet is very useful.

If a decorative sheet is used to decorate an exterior member, however, the ink contained in the decoration layer might be deteriorated by UV rays included in sunlight. For that reason, the weather resistance of a decorative sheet needs to be increased.

Japanese Laid-Open Patent Publication No. 2004-250581 discloses a stack of resin layers with good weather resistance. FIG. 11 illustrates such a stack 210 of resin layers.

As shown in FIG. 11, the stack 210 of resin layers includes a base member 211 made of polycarbonate, an acrylic resin layer 212 with a UV absorbent material, and a cured layer 213 formed by curing a coating agent in which a number of ingredients are compounded so as to have a particular composition. These members and layers are stacked in this order one upon the other.

This stack 210 of resin layers realizes high weather resistance because the UV absorbent material included in the acrylic resin layer 212 absorbs UV rays.

However, the present inventors discovered and confirmed via experiments that even when a stack 210 of resin layers as disclosed in Japanese Laid-Open Patent Publication No. 2004-250581, was actually used as a decorative sheet and attached to a formed product by the technique disclosed in Japanese Laid-Open Patent Publication No. 2005-153351, supra, it was difficult in fact to realize sufficiently high weather resistance. This is because the decorative sheet being attached is stretched that its thickness is reduced. If the acrylic resin layer 212 has a reduced thickness, then the amount of the UV absorbent material contained per unit area of the decorative sheet decreases. As a result, UV rays cannot be absorbed sufficiently and the weather resistance decreases.

To overcome such a problem, the overall decorative sheet may be thickened in advance because the decorative sheet is supposed to be stretched and have a reduced thickness eventually. However, the decorative sheet being attached to a formed product is not stretched uniformly everywhere. That is to say, the decorative sheet is stretched to different degrees from one portion of the sheet to another. For that reason, if the entire sheet were thickened, then a portion that would be thick enough even without being thickened that way should be too thick to avoid a significant increase in cost.

Only the acrylic resin layer 212 including the UV absorbent material could be thickened. Actually, however, the acrylic resin layer 212 cannot be stretched so easily as the base member 211 of polycarbonate. That is why the thickened acrylic resin layer 212 could crack when stretched.

SUMMARY OF THE INVENTION

In order to overcome the problems described above, the present invention increases the weather resistance of a decorative sheet that is supposed to be attached onto the surface of an object while being stretched and also prevents the sheet being attached from cracking.

A decorative sheet according to a preferred embodiment of the present invention is attached to the surface of an object while being stretched. The decorative sheet preferably includes: a base member, which has first and second opposed principal surfaces; a protective layer, which is arranged over the first principal surface of the base member; and a coloring layer, which is arranged either over the second principal surface of the base member or between the base member and the protective layer and which includes a pigment. The protective layer preferably has a thickness of about 30 µm to about 60 µm and includes about 1.4 wt % to about 4.0 wt % of UV absorbent material. And the coloring layer has a thickness of about 15 µm to about 80 µm and includes about 1.0 wt % to about 4.0 wt % of UV absorbent material.

In one preferred embodiment, the base member preferably has a thickness of about 300 µm to about 800 µm.

In another preferred embodiment, the pencil hardness of the protective layer at room temperature is higher than that of the base member.

A formed product according to a preferred embodiment of the present invention includes a formed product body and a decorative sheet according to any of the preferred embodiments of the present invention described above that has been attached to a surface of the formed product body.

In one preferred embodiment, the decorative sheet is bent over edges of the formed product body to reach the back surface of the formed product body.

In another preferred embodiment, a portion of the decorative sheet is preferably about 30% to about 50% as thick as the thickest portion of the decorative sheet.

A transportation apparatus according to a preferred embodiment of the present invention includes a formed product according to any of the preferred embodiments described above.

In a decorative sheet according to various preferred embodiments of the present invention, a UV absorbent material is included in both the protective layer and coloring layer thereof (i.e., not just in the protective layer but also in the coloring layer), thus realizing high weather resistance easily.

Also, in the decorative sheet of the present invention, the protective layer preferably has a thickness of about 30 μm to about 60 μm and includes about 1.4 wt % to about 4.0 wt % of UV absorbent material, while the coloring layer has a thickness of about 15 μm to about 80 μm and includes about 1.0 wt % to about 4.0 wt % of UV absorbent material. In this manner, the thicknesses and the contents of the UV absorbent material of both the protective layer and the coloring layer are defined within predetermined ranges. That is why even if the decorative sheet is attached onto the surface of an object while being stretched, sufficiently high weather resistance is realized and cracking can be avoided.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. It should be noted, however, that the present invention is in no way limited to the following specific preferred embodiments.

Figure 1:
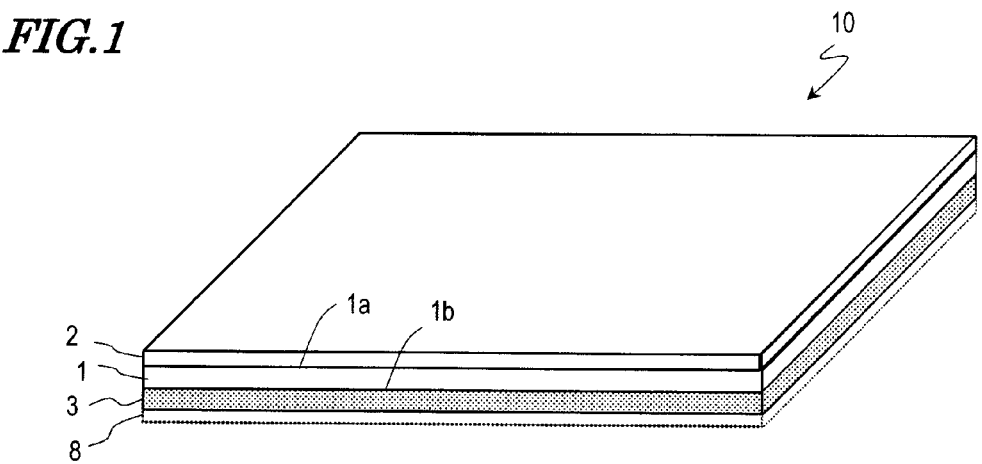
FIG. 1 is a perspective view schematically illustrating a decorative sheet 10 according to a preferred embodiment of the present invention.

FIG. 1 schematically illustrates a decorative sheet 10 according to a preferred embodiment of the present invention. The decorative sheet 10 is supposed to be attached onto the surface of an object while being stretched.

As shown in FIG. 1, the decorative sheet 10 includes a base member 1 with two opposed principal surfaces 1a and 1b, a protective layer 2 arranged over one principal surface 1a of the base member 1, and a coloring layer 3 arranged over the other principal surface 1b of the base member 1.

The base member 1 is preferably made of a resin material and is typically made of a thermoplastic resin such as polycarbonate or vinyl chloride resin. The base member 1 should have some degree of rigidity that is high enough to serve as a sheet base member. That is why the material is preferably selected in view of this respect. The base member 1 preferably has a thickness of about 300 μm to about 800 μm. This is because if the base member 1 had a thickness of less than about 300 μm, the sheet would be difficult to handle or its mechanical strength could be too low to avoid tears when the sheet is being attached. On the other hand, if the thickness of the base member 1 exceeded about 800 μm, then the sheet could not fit closely the surface of the object to be decorated.

The protective layer 2 is preferably made of a resin material. To increase the damage resistance of the decorative sheet 10 to a sufficiently high level, the pencil hardness of the protective layer 2 at room temperature is preferably higher than that of the base member 1. Examples of resin materials for the protective layer 2 include acrylic resins and vinyl chloride resins. For example, an acrylic resin including about 80 mol % or more of methyl methacrylate monomer derived repeating units and having a weight average molecular weight of approximately 70,000 to 150,000 can be used effectively. As a base member 1 with such a protective layer 2, acrylic co-extruded polycarbonate DO-2 (produced by Mitsubishi Gas Chemicals Co., Inc.) may be used, for instance.

The coloring layer 3 includes, and is colored by, a pigment. The coloring layer 3 may be formed by printing ink including a binder resin and the pigment dispersed in the binder resin. As the binder resin, an acrylic resin, a urethane resin, or an acrylic-urethane resin may be used, for example.

The protective layer 2 and the coloring layer 3 both include a UV absorbent material, which may be a known one. The UV absorbent material included in the protective layer 2 may be TINUVIN 1577FF produced by Ciba Specialty Chemicals. On the other hand, the UV absorbent material included in the coloring layer 3 may be TINUVIN 328 or TINUVIN 571 also produced by Ciba Specialty Chemicals.

Specifically, the UV absorbent material included in the coloring layer 3 may be either solid at an ordinary temperature (as in TINUVIN 328 mentioned above) or liquid at an ordinary temperature (as in TINUVIN 571 mentioned above). If a liquid UV absorbent material is used, the coloring layer 3 will stretch more easily, and therefore is less likely to crack, than using a solid UV absorbent material. When a liquid UV absorbent material is used, however, that UV absorbent material might ooze out of the coloring layer 3 depending on its thickness.

When the decorative sheet 10 is attached to a formed product, an adhesive 8 is applied onto the coloring layer 3 as indicated by the dotted line in FIG. 1. As the adhesive, a urethane or acrylic adhesive is preferably used.

The decorative sheet 10 with such a structure may be used in a forming process as disclosed in Japanese Laid-Open Patent Publication No. 2005-153351 and can be used effectively to decorate a formed product with an extremely rugged surface.

The decorative sheet 10 of this preferred embodiment includes a UV absorbent material in both of the protective layer 2 and the coloring layer 3 (i.e., not just in the protective layer 2 but also in the coloring layer 3), thus realizing high weather resistance relatively easily. Hereinafter, the reasons will be described more specifically.

To prevent a UV ray from reaching the coloring layer 3, it seems that a lot of UV absorbent material simply should be added only to the protective layer 2. Actually, however, it is very difficult to absorb all UV rays (included in sunlight) impinging on the decorative sheet 10 with only the protective layer 2. That is why some of the UV rays that have been incident on the decorative sheet 10 attached to an object are transmitted through the protective layer 2 to reach the base member 1 and the coloring layer 3. After that, those UV rays are repeatedly reflected from the interface between the decorative sheet 10 and the object, the interface between the base member 1 and the coloring layer 3, and the interface between the base member 1 and the protective layer 2. Consequently, part of a UV ray that has once been transmitted through the coloring layer 3 may come back to the same coloring layer 3 again.

If the UV absorbent material were included only in the protective layer 2, a UV ray that has once been transmitted through the protective layer 2 would never be absorbed into the UV absorbent material as long as the UV ray is repeatedly reflected from those interfaces. As a result, the coloring layer 3 would be deteriorated by the UV ray.

If the UV absorbent material is included in both the protective layer 2 and the coloring layer 3 as in this preferred embodiment, however, then a UV ray that has been transmitted through the protective layer 2 can be absorbed into the UV absorbent material included in the coloring layer 3. That is why it is possible to minimize the deterioration of the coloring layer 3 due to the repetitive exposure to the UV ray. As a result, the weather resistance of the decorative sheet 10 increases significantly.

Also, when the decorative sheet 10 is attached onto an object while being stretched, the thickness of the decorative sheet 10 may vary and part of the protective layer 2 may become too thin. If the protective layer 2 may become thin in certain areas in this manner or if the amount of the UV absorbent material included in the protective layer 2 is small, then many UV rays may transmit through the protective layer 2. However, if the UV absorbent material is included not just in the protective layer 2 but also in the coloring layer 3 as in this preferred embodiment, sufficiently high weather resistance is still guaranteed even when quite a few UV rays may transmit through the protective layer 2.

Furthermore, in the decorative sheet 10 of this preferred embodiment, the thicknesses and the UV absorbent material contents of both the protective layer 2 and the coloring layer 3 are defined within predetermined ranges. That is why even if the decorative sheet 10 is attached onto the surface of an object while being stretched, the decorative sheet 10 never cracks but realizes sufficiently high weather resistance.

Specifically, the protective layer 2 preferably has a thickness of about 30 μm to about 60 μm and preferably includes about 1.4 wt % to about 4.0 wt % of UV absorbent material. On the other hand, the coloring layer 3 preferably has a thickness of about 15 μm to about 80 μm and preferably includes about 1.0 wt % to about 4.0 wt % of UV absorbent material. Hereinafter, it will be described why these ranges are preferred.

A number of decorative sheets 10, including protective layers 2 of various thicknesses and coloring layers 3 of various thicknesses, were provided, stretched to a predetermined thickness and then evaluated with respect to their weather resistance, cracking of the protective layer 2, cracking of the coloring layer 3 and oozing of the UV absorbent material out of the coloring layer 3. The results are shown in the following Table 1. The thicknesses of the base members 1, protective layers 2 and coloring layers 3 shown in Table 1 were measured before and after stretching. Most of those decorative sheets 10 were rated in the three grades of "Good", "Fair" and "Bad". The weather resistance was estimated with a sunshine weatherometer compliant with the JIS B7753 standard. If a decorative sheet 10 could maintain a color difference ΔE of 3 or less and at least 50% of the initial gloss for 600 hours or more, then the decorative sheet 10 was rated "Good". If a decorative sheet 10 could maintain a color difference ΔE of 3 or less and at least 50% of the initial gloss for equal to or longer than 400 hours but less than 600 hours, then the decorative sheet 10 was rated "Fair". And if a decorative sheet 10 could maintain a color difference ΔE of 3 or less and at least 50% of the initial gloss for less than 400 hours, then the decorative sheet 10 was rated "Bad". Oozing of the UV absorbent material was rated by observing the appearance of a decorative sheet 10 that was heated to 80° C. after having been stretched. This temperature was adopted because if the decorative sheet 10 is used to decorate an exterior member of a motorcycle, then the decorative sheet 10 would be heated to around 80° C. in sunshine.

TABLE 1

| | Base member Thickness (μm) | | Protective layer | | | Coloring layer | | | Results of evaluations | | | | | Thickness ratio Before And after stretch |
|---|---|---|---|---|---|---|---|---|---|---|---|---|---|---|
| | | | Thickness (μm) | | UV absorbent | Thickness (μm) | | UV Absorbent | Weather | Protective layer | | Coloring layer | | |
| No | Bfo. | Aft. | Bfo. | Aft. | content | Bfo. | Aft. | content | resistance | cracked? | Oozing | cracked? | Total | |
| 1 | 500 | 150 | 20 | 6 | 2 wt % | 15 | 4.5 | 2 wt % | Good | NO | NO | NO | Fair | 0.3 |
| 2 | 500 | 250 | 30 | 15 | 2 wt % | 15 | 7.5 | 2 wt % | Good | NO | NO | NO | Good | 0.5 |
| 3 | 500 | 200 | 50 | 20 | 2 wt % | 15 | 6 | 2 wt % | Good | NO | NO | NO | Good | 0.4 |
| 4 | 500 | 200 | 60 | 24 | 2 wt % | 15 | 6 | 2 wt % | Good | NO | NO | NO | Good | 0.4 |
| 5 | 500 | 200 | 80 | 32 | 2 wt % | 15 | 6 | 2 wt % | Good | YES | NO | NO | Bad | 0.4 |
| 6 | 500 | 200 | 50 | 20 | 2 wt % | 10 | 4 | 2 wt % | Good | NO | NO | NO | Fair | 0.4 |
| 7 | 500 | 200 | 50 | 20 | 2 wt % | 15 | 6 | 2 wt % | Good | NO | NO | NO | Good | 0.4 |

TABLE 1-continued

| | Base member Thickness (μm) | | Protective layer Thickness (μm) | | UV absorbent | Coloring layer Thickness (μm) | | UV Absorbent | Results of evaluations | | | | | Thickness ratio Before And after |
|---|---|---|---|---|---|---|---|---|---|---|---|---|---|---|
| No | Bfo. | Aft. | Bfo. | Aft. | content | Bfo. | Aft. | content | Weather resistance | Protective layer cracked? | Oozing | Coloring layer cracked? | Total | stretch |
| 8 | 500 | 250 | 50 | 25 | 2 wt % | 80 | 40 | 2 wt % | Good | NO | NO | NO | Good | 0.5 |
| 9 | 500 | 150 | 50 | 15 | 2 wt % | 90 | 27 | 2 wt % | Good | NO | NO | YES, Partially | Bad | 0.3 |
| 10 | 500 | 200 | 50 | 20 | 2 wt % | 100 | 40 | 2 wt % | Good | NO | NO | YES, noticeably | Bad | 0.4 |

As can be seen from the results of Sample #5 including a protective layer 2 with a thickness of about 80 μm, if the thickness of the protective layer 2 exceeded about 60 μm, the protective layer 2 cracked. Sample #1 including a protective layer 2 with a thickness of about 20 μm had no problem with its weather resistance, cracking and oozing but its overall rating is "Fair", not "Good". This is because if the protective layer 2 were too thin (more specifically, had a thickness of less than about 30 μm), then the thickness of the protective layer 2 would vary significantly while the decorative sheet 10 is being made, thus making it difficult to form the sheet uniformly. The variation in the thickness of the protective layer 2 would cause a variation in the weather resistance of the decorative sheet.

As also can be seen from the results of Sample #9 including a coloring layer 3 with a thickness of about 90 μm and Sample #10 including a coloring layer 3 with a thickness of about 100 μm, if the thickness of the coloring layer 3 exceeded about 80 μm, the coloring layer 3 cracked. Sample #6 including a coloring layer 3 with a thickness of about 10 μm had no problem with its weather resistance, cracking and oozing but its overall rating is "Fair", not "Good". This is because if the coloring layer 3 were too thin (more specifically, had a thickness of less than about 15 μm), then the thickness of the coloring layer 3 would vary significantly while the decorative sheet 10 is being made, thus producing color unevenness.

On the other hand, Samples #2, #3, #4, #7 and #8 of which the protective layer 2 has a thickness of about 30 μm to about 60 μm and the coloring layer 3 has a thickness of about 15 μm to about 80 μm had no problem with its weather resistance, cracking and oozing. The variations in the thicknesses of the protective layer 2 and the coloring layer 3 while the sheet was being made were also small. For these reasons, the protective layer 2 preferably has a thickness of about 30 μm to about 60 μm and the coloring layer 3 preferably has a thickness of about 15 μm to about 80 μm.

Tables 2, 3 and 4 shows the results in three different situations where the thicknesses of the base member 1 were changed into about 300 μm, about 500 μm and about 800 μm, respectively, with the thicknesses and the UV absorbent material contents of the protective coating 2 and the coloring layer 3 varied.

TABLE 2

| | Base member Thickness (μm) | | Protective layer Thickness (μm) | | UV absorbent | Coloring layer Thickness (μm) | | UV Absorbent | Results of evaluations | | | | | Thickness ratio before and after |
|---|---|---|---|---|---|---|---|---|---|---|---|---|---|---|
| No. | Bfo. | Aft. | Bfo. | Aft. | content | Bfo. | Aft. | content | Weather resistance | Protective layer cracked? | Oozing | Coloring layer cracked? | Total | stretch |
| 11 | 300 | 120 | 20 | 8 | 1.4 wt % | 15 | 6 | 1 wt % | Fair | NO | NO | NO | Bad | 0.4 |
| 12 | 300 | 150 | 30 | 15 | 4 wt % | 15 | 7.5 | 4 wt % | Good | NO | NO | NO | Good | 0.5 |
| 13 | 300 | 120 | 80 | 32 | 1.4 wt % | 15 | 6 | 4 wt % | Good | YES, noticeably | NO | NO | Bad | 0.4 |
| 14 | 300 | 90 | 60 | 18 | 4 wt % | 15 | 4.5 | 0 wt % | Fair | NO | NO | NO | Bad | 0.3 |
| 15 | 300 | 90 | 60 | 18 | 5 wt % | 15 | 4.5 | 0 wt % | Fair | YES, partially | NO | NO | Bad | 0.3 |
| 16 | 300 | 90 | 60 | 18 | 0 wt % | 80 | 24 | 4 wt % | Bad | NO | NO | NO | Bad | 0.3 |
| 17 | 300 | 90 | 60 | 18 | 0 wt % | 80 | 24 | 5 wt % | Bad | NO | NO | YES, partially | Bad | 0.3 |
| 18 | 300 | 90 | 30 | 9 | 1.4 wt % | 15 | 4.5 | 1 wt % | good | NO | NO | NO | Good | 0.3 |
| 19 | 300 | 90 | 60 | 18 | 4 wt % | 80 | 24 | 4 wt % | good | NO | NO | YES, partially | Good | 0.3 |
| 20 | 300 | 120 | 60 | 24 | 1.4 wt % | 20 | 8 | 1.4 wt % | good | NO | NO | NO | Good | 0.4 |
| 21 | 300 | 120 | 60 | 24 | 1.4 wt % | 20 | 8 | 1.4 wt % (liquid) | good | NO | NO | NO | Good | 0.4 |
| 22 | 300 | 90 | 50 | 15 | 2.5 wt % | 90 | 27 | 1.4 wt % | good | NO | NO | YES, partially | Bad | 0.3 |
| 23 | 300 | 90 | 50 | 15 | 2 wt % | 90 | 27 | 4 wt % (liquid) | good | NO | YES, locally | NO | Bad | 0.3 |

TABLE 3

| | Base member Thickness (μm) | | Protective layer | | | Coloring layer | | | Results of evaluations | | | | | Thickness ratio before and after stretch |
|---|---|---|---|---|---|---|---|---|---|---|---|---|---|---|
| | | | Thickness (μm) | | UV absorbent | Thickness (μm) | | UV Absorbent | Weather | Protective layer | | Coloring layer | | |
| No. | Bfo. | Aft. | Bfo. | Aft. | content | Bfo. | Aft. | content | resistance | cracked? | Oozing | cracked? | Total | |
| 24 | 500 | 200 | 20 | 8 | 1.4 wt % | 15 | 6 | 1 wt % | Fair | NO | NO | NO | Bad | 0.4 |
| 25 | 500 | 250 | 30 | 15 | 4 wt % | 15 | 7.5 | 4 wt % | Good | NO | NO | NO | Good | 0.5 |
| 26 | 500 | 200 | 80 | 32 | 1.4 wt % | 15 | 6 | 4 wt % | Good | YES, noticeably | NO | NO | Bad | 0.4 |
| 27 | 500 | 150 | 30 | 9 | 1.4 wt % | 15 | 4.5 | 1 wt % | Good | NO | NO | NO | Good | 0.3 |
| 28 | 500 | 150 | 60 | 18 | 4 wt % | 80 | 24 | 4 wt % | Good | NO | NO | NO | Good | 0.3 |
| 29 | 500 | 200 | 60 | 24 | 1.4 wt % | 20 | 8 | 1.4 wt % | Good | NO | NO | NO | Good | 0.4 |
| 30 | 500 | 200 | 60 | 24 | 1.4 wt % | 20 | 8 | 1.4 wt % (liquid) | Good | NO | NO | NO | Good | 0.4 |
| 31 | 500 | 150 | 50 | 15 | 2 wt % | 90 | 27 | 1.4 wt % | Good | NO | NO | YES, partially | Bad | 0.3 |
| 32 | 500 | 150 | 50 | 15 | 2.5 wt % | 90 | 27 | 4 wt % (liquid) | Good | NO | YES, locally | NO | Bad | 0.3 |

TABLE 4

| | Base member Thickness (μm) | | Protective layer | | | Coloring layer | | | Results of evaluations | | | | | Thickness ratio before and after stretch |
|---|---|---|---|---|---|---|---|---|---|---|---|---|---|---|
| | | | Thickness (μm) | | UV absorbent | Thickness (μm) | | UV Absorbent | Weather | Protective layer | | Coloring layer | | |
| No. | Bfo. | Aft. | Bfo. | Aft. | content | Bfo. | Aft. | content | resistance | cracked? | Oozing | cracked? | Total | |
| 33 | 800 | 320 | 20 | 8 | 1.4 wt % | 15 | 6 | 1 wt % | Fair | NO | NO | NO | Bad | 0.4 |
| 34 | 800 | 320 | 30 | 12 | 4 wt % | 15 | 6 | 4 wt % | Good | NO | NO | NO | Good | 0.4 |
| 35 | 800 | 320 | 80 | 32 | 1.4 wt % | 15 | 6 | 4 wt % | Good | YES, noticeably | NO | NO | Bad | 0.4 |
| 36 | 800 | 240 | 30 | 9 | 1.4 wt % | 15 | 4.5 | 1 wt % | Good | NO | NO | NO | Good | 0.3 |
| 37 | 800 | 240 | 60 | 18 | 4 wt % | 80 | 24 | 4 wt % | Good | NO | NO | NO | Good | 0.3 |
| 38 | 800 | 240 | 50 | 15 | 1.4 wt % | 90 | 27 | 1.4 wt % | Good | NO | NO | YES, partially | Bad | 0.3 |
| 39 | 800 | 240 | 50 | 15 | 2.5 wt % | 90 | 27 | 4 wt % (liquid) | Good | NO | YES, locally | NO | Bad | 0.3 |
| 40 | 800 | 320 | 60 | 24 | 1.4 wt % | 20 | 8 | 1.4 wt % (liquid) | Good | NO | NO | NO | Good | 0.4 |
| 41 | 800 | 320 | 60 | 24 | 1.4 wt % | 20 | 8 | 1.4 wt % | Good | NO | NO | NO | Good | 0.4 |

In Tables 2, 3 and 4, comparing multiple samples including base members 1 with mutually different thicknesses (e.g., Samples #11, #24 and #33 and Samples #19, #28 and #37), it can be seen that even if the base members 1 had different thicknesses but if the protective layers 2 had the same thickness and the same UV absorbent material content and if the coloring layers 3 had the same thickness and the same UV absorbent material content, the same results of evaluation were obtained. This means that within this base member thickness range, the weather resistance and the non-crackability (i.e., formability) did not depend on the thickness of the base member 1 but on the thickness and UV absorbent material content of the protective layer 2 and those of the coloring layer 3.

If the protective layer 2 and the coloring layer 3 had their preferred minimum thicknesses of about 30 μm and about 15 μm and UV absorbent material contents of about 1.4 wt % and about 1.0 wt %, respectively (i.e., in Sample #18 shown in Table 2), sufficiently high weather resistance was realized. On the other hand, if the protective layer 2 and the coloring layer 3 had thicknesses of about 30 μm and about 15 μm, respectively, and a UV absorbent material content of about 1.0 wt % (not shown in any of these tables), the resultant weather resistance was not enough. Likewise, if either the protective layer 2 or the coloring layer 3 included no UV absorbent material at all (as in Samples #14, #15, #16 and #17), the resultant weather resistance was not enough, either.

Also, if the protective layer 2 and the coloring layer 3 had their preferred maximum thicknesses of about 60 μm and about 80 μm, respectively, and a UV absorbent material content of about 4.0 wt % (i.e., in Sample #19 shown in Table 2), neither the protective layer 2 nor the coloring layer 3 cracked and good formability was realized. On the other hand, if the protective layer 2 had a thickness of about 60 μm and a UV absorbent material content of about 5.0 wt % (as in Sample #15), the protective layer 2 cracked. Likewise, if the coloring layer 3 had a thickness of about 80 μm and a UV absorbent material content of about 5.0 wt % (as in Sample #17), the coloring layer 3 cracked, too.

As can be seen from these results, the protective layer 2 preferably has a UV absorbent material content of about 1.4 wt % to about 4.0 wt %, and the coloring layer 3 preferably has a UV absorbent material content of about 1.0 wt % to about 4.0 wt %.

In fact, when the protective layer 2 and the coloring layer 3 had a thickness of about 30 µm to about 60 µm and a thickness of about 15 µm to about 80 µm, respectively, and also had UV absorbent material contents falling within the ranges defined above (as in Samples #12, #18, #19, #20 and #21), good results of evaluation were achieved.

Also, comparing a sample including a solid UV absorbent material in its coloring layer 3 to a sample including a liquid UV absorbent material in its coloring layer 3 (e.g., Samples #22 and #23, Samples #31 and #32 and Samples #38 and #39), it can be seen that when the liquid UV absorbent material was used, the coloring layer 3 did not crack easily but that if the coloring layer 3 was thick (e.g., had a thickness of about 90 µm), oozing occurred easily.

As described above, by setting the thickness and UV absorbent material content of the protective layer 2 within the range of about 30 µm to about 60 µm and within the range of about 1.4 wt % to about 4.0 wt % and by setting the thickness and UV absorbent material content of the coloring layer 3 within the range of about 15 µm to about 80 µm and within the range of about 1.0 wt % to about 4.0 wt %, it is possible to prevent the decorative sheet 10 from cracking and sufficiently high weather resistance is realized.

In FIG. 1, a structure in which the protective layer 2 is arranged on one side of the base member 1 and the coloring layer 3 on the other side of the base member 1 is illustrated. However, the coloring layer 3 does not always have to be arranged that way. Alternatively, as in the decorative sheets 10A and 10B shown in FIGS. 2A and 2B, the coloring layer 3 may also be located between the base member 1 and the protective layer 2.

Figure 2A:
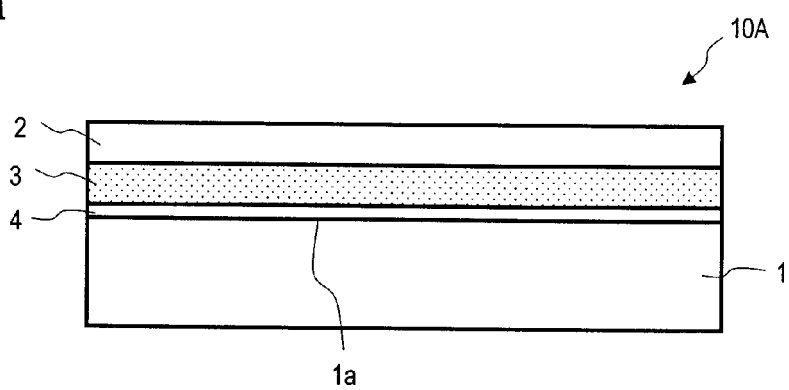
FIGS. 2A and 2B are cross-sectional views schematically illustrating alternative decorative sheets 10A and 10B according to other preferred embodiments of the present invention.

Specifically, in the decorative sheet 10A shown in FIG. 2A, an adhesive layer 4, the coloring layer 3 and the protective layer 2 are stacked in this order on the principal surface 1a of the base member 1. On the other hand, in the decorative sheet 10B shown in FIG. 2B, the coloring layer 3, the adhesive layer 4, and the protective layer 2 are stacked in this order on the principal surface 1a of the base member 1. Both of these alternative decorative sheets 10A and 10B also realize good weather resistance similarly to the decorative sheet 10 shown in FIG. 1 because the protective layer 2 and the coloring layer 3 thereof both include a UV absorbent material.

The decorative sheet 10A shown in FIG. 2A may be preferably made in the following manner, for example. First, a protective layer 2 is formed by an extrusion molding process. Next, a coloring layer 3 is formed by a printing process on this protective layer 2. Subsequently, an adhesive layer 4 is applied onto either the coloring layer 3 or a base member 1 that has been formed separately by an extrusion molding process. Thereafter, the stack of the protective layer 2 and the coloring layer 3 and the base member 1 are bonded together with the adhesive layer 4, thereby obtaining the decorative sheet 10A.

Figure 2B:
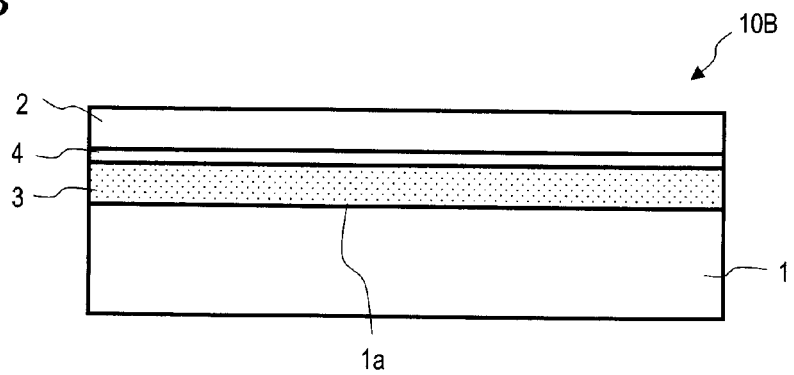

On the other hand, the decorative sheet 10B shown in FIG. 2B may be preferably made in the following manner, for example. First, a base member 1 is formed by an extrusion molding process. Next, a coloring layer 3 is formed by a printing process on this base member 1. Subsequently, an adhesive layer 4 is applied onto either the coloring layer 3 or a protective layer 2 that has been formed separately by an extrusion molding process. Thereafter, the stack of the base member 1 and the coloring layer 3 and the protective layer 2 are bonded together with the adhesive layer 4, thereby obtaining the decorative sheet 10B.

In either case, the adhesive layer 4 may be made of a known adhesive and may be formed by any of various known methods. The adhesive layer 4 may have a thickness of about 10 µm to about 60 µm, for example.

Figure 3:
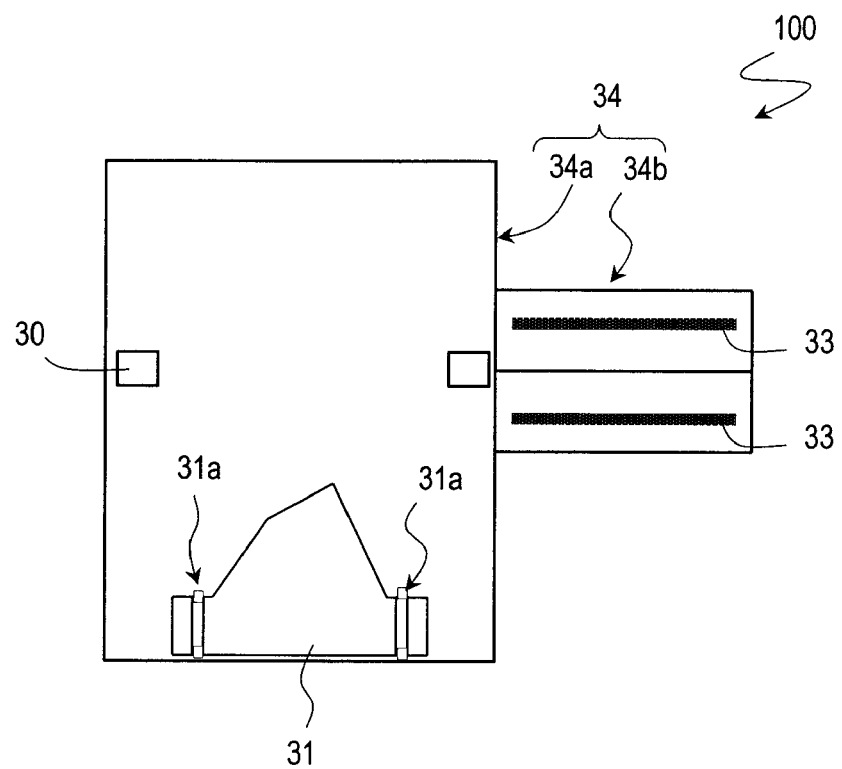
FIG. 3 schematically illustrates a vacuum forming system for use to decorate a formed product with the decorative sheet 10.

Hereinafter, it will be described with reference to FIGS. 3 through 6 how to decorate a formed product with the decorative sheet 10. FIG. 3 schematically illustrates a vacuum forming system 100 for use to decorate a formed product with the decorative sheet 10. FIGS. 4 through 6 are cross-sectional views schematically illustrating forming processing steps that use the vacuum forming system 100.

The vacuum forming system 100 shown in FIG. 3 includes a gripping frame 30 to grip the decorative sheet 10 thereon, a supporting stage 31 for supporting a formed product thereon, a heater (such as a far-infrared heater) 33 for heating the decorative sheet 10, and a vacuum vessel 34 that stores all of these members.

The vacuum vessel 34 includes a main vessel 34a that stores the gripping frame 30 and the supporting stage 31, and a sub-vessel 34b that stores the heater 33. When the decorative sheet 10 is heated, the heater 33 is introduced into the main vessel 34a.

The supporting stage 31 has a plurality of openings 31a, through which the air inside the main vessel 34a can be exhausted. Although not shown in FIG. 3, a mechanism for introducing a gas from outside of this system into the main vessel 34a (e.g., a hose connected to outside) is also provided for the main vessel 34a.

Using this vacuum forming system 100, a formed product may be decorated with the decorative sheet 10 in the following manner, for example.

Figure 4A:
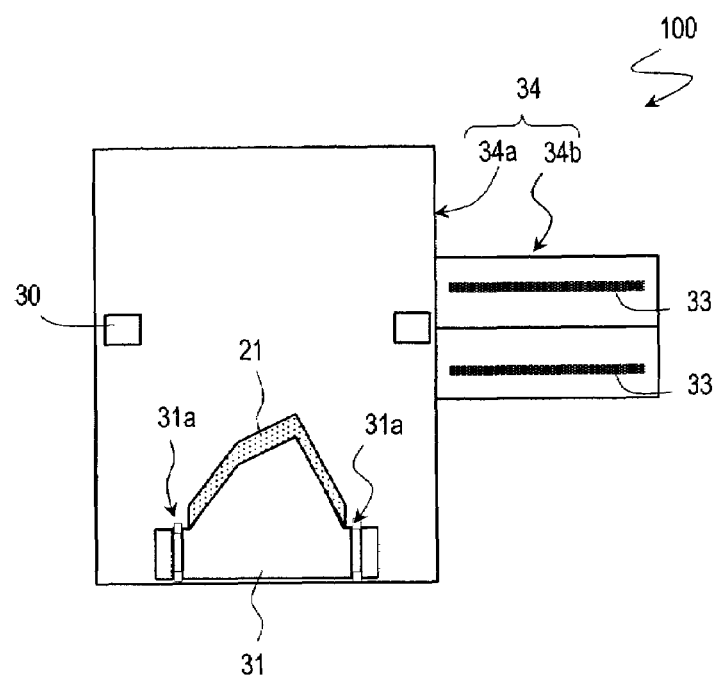
FIGS. 4A and 4B are cross-sectional views schematically illustrating forming processing steps using the vacuum forming system shown in FIG. 3.

First, as shown in FIG. 4A, a formed product body 21 is provided and mounted on the supporting stage 31. The formed product body 21 may be made of a resin material, a metallic material or any other suitable material by a known technique. For example, the formed product body 21 may be made of a resin material by an injection molding process.

Figure 4B:
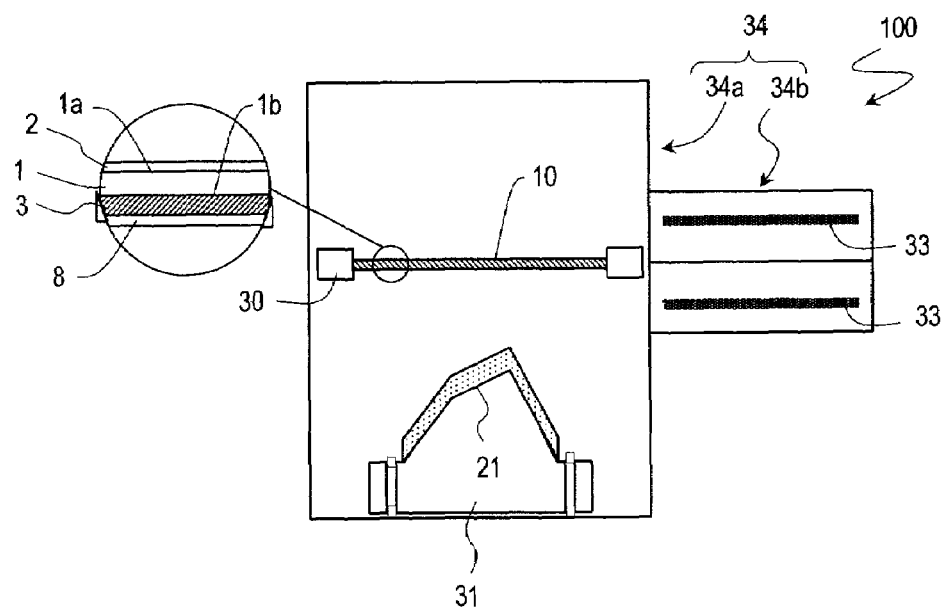

Thereafter, as shown in FIG. 4B, a decorative sheet 10 is provided and fixed onto the gripping frame 30. As partially enlarged in FIG. 4B, the decorative sheet 10 includes a base member 1, and a protective layer 2 and a coloring layer 3, both of which include a UV absorbent material.

Figure 5A:
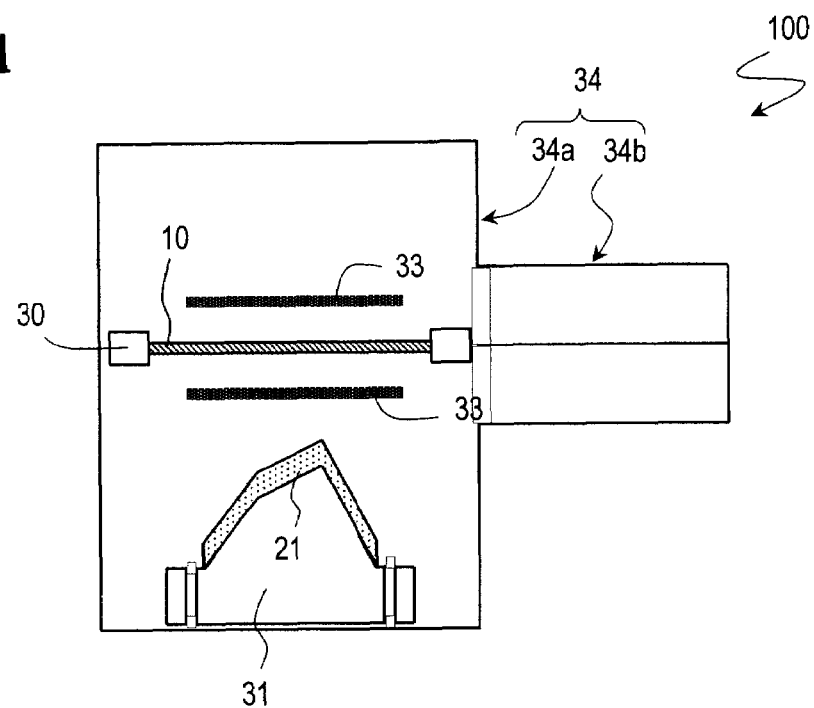
FIGS. 5A and 5B are cross-sectional views schematically illustrating forming processing steps using the vacuum forming system shown in FIG. 3.

Subsequently, as shown in FIG. 5A, the decorative sheet 10 is heated with the heater 33, thereby softening the decorative sheet 10. In this process step, the decorative sheet 10 is preferably heated to a temperature that is approximately 20° C. to 30° C. higher than the lowest adhesion temperature of the adhesive 8 to ensure good adhesiveness for the adhesive 8.

Figure 5B:
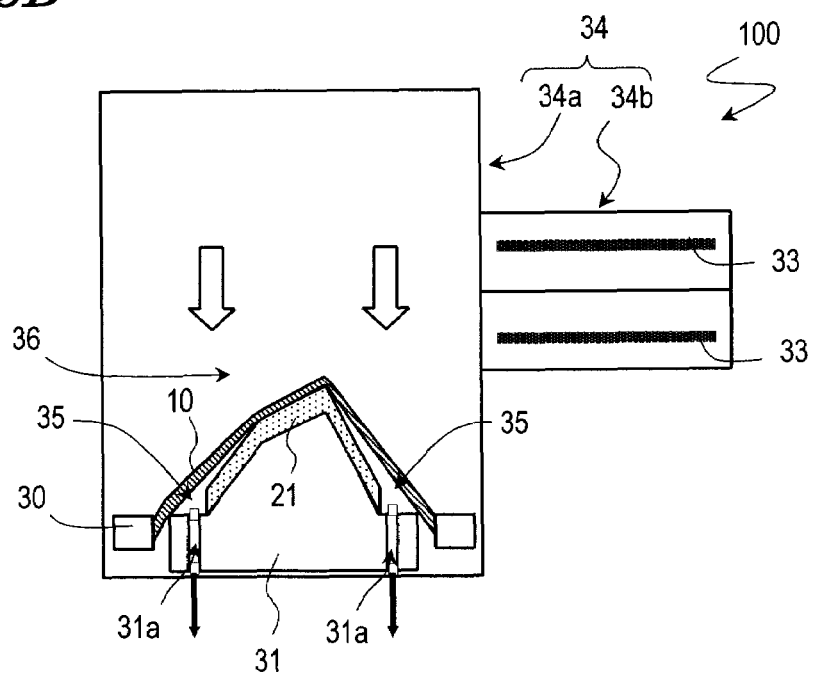
Figure 6A:
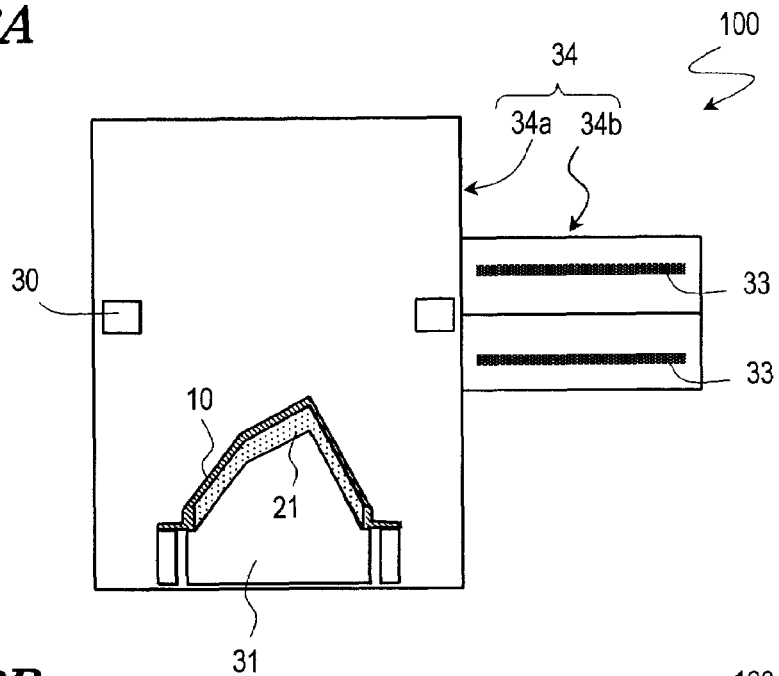
FIGS. 6A, 6B and 6C are cross-sectional views schematically illustrating forming processing steps using the vacuum forming system shown in FIG. 3.

Thereafter, as shown in FIG. 5B, the decorative sheet 10 is brought down toward the formed product body 21 and then the pressure in the space 35 between the decorative sheet 10 and the formed product body 21 is reduced, thereby bonding the decorative sheet 10 onto the formed product body 21 as shown in FIG. 6A. If the pressure in the space 35 between the decorative sheet 10 and the formed product body 21 is reduced, then the decorative sheet 10 will be pressed against the formed product body 21 with uniform pressure. As a result, the sheet 10 can be bonded to the product 21 effectively.

In this preferred embodiment, the space 36 over the decorative sheet 10 is also pressurized, thereby making an even bigger pressure difference. Consequently, the decorative sheet 10 can be bonded even more quickly. The pressure in the space 35 may be reduced by exhausting the air in the space 35 through the openings 31a of the supporting stage 31 using a vacuum pump, for example. On the other hand, the pressure in the space 36 may be increased by supplying compressed air thereto using a compressor, for example. In this bonding process step, the decorative sheet 10 is stretched and formed so as to fit the surface shape of the formed product 21 closely.

Figure 6B:
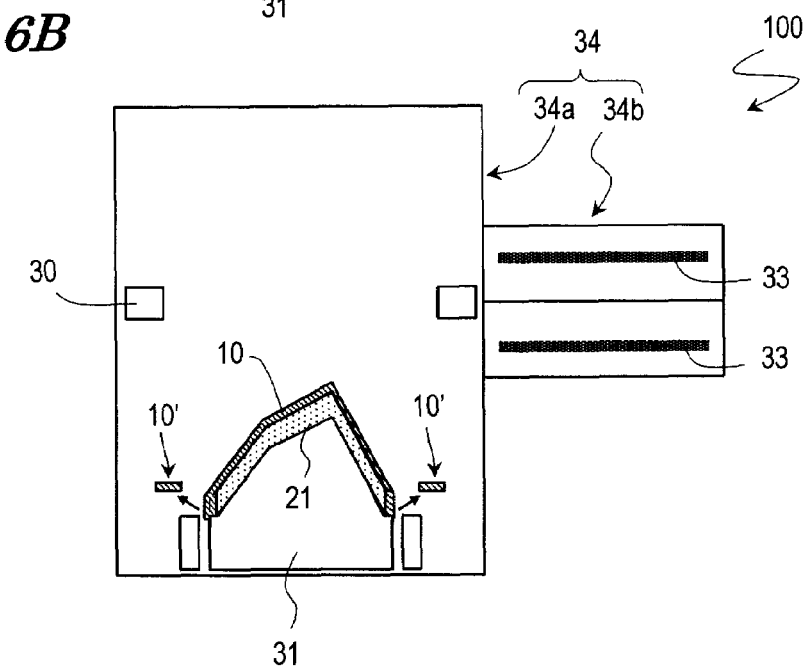
Figure 6C:
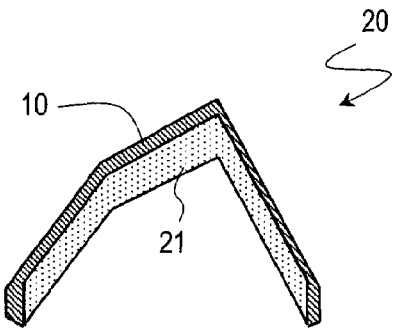

Subsequently, as shown in FIG. 6B, an excessive portion 10' of the decorative sheet 10 is trimmed with a rotating blade or any other cutter, and then the formed product body 21 is removed from the supporting stage 31, thereby completing a formed product 20 with a decorated surface as shown in FIG. 6C.

If the decorative sheet 10 of this preferred embodiment is used, it is possible to prevent the protective layer 2 and the coloring layer 3 from cracking while ensuring sufficiently high weather resistance and abrasion resistance. As a result, a formed product that can be used outdoors for a long time while maintaining its fine appearance is realized.

Figure 7:
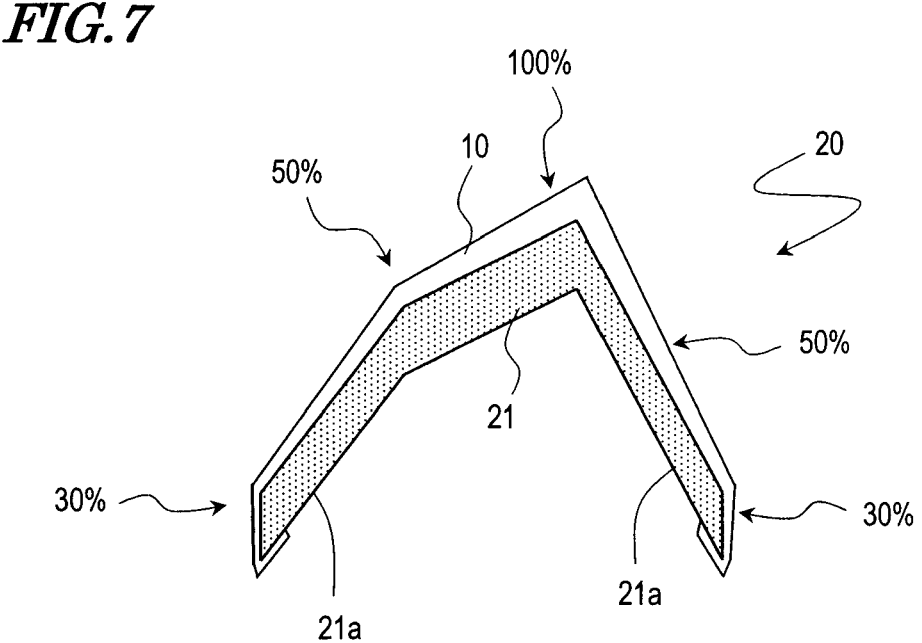
FIG. 7 is a cross-sectional view illustrating an example of a formed product decorated with the decorative sheet 10.

An example of a formed product 20 decorated with the decorative sheet 10 is shown in FIG. 7. In the formed product 20 shown in FIG. 7, the decorative sheet 10 has been attached so as to cover the edges of the formed product body 21 and reach the back surface 21a of the formed product body 21. In this manner, the decorative sheet 10 may be partially bent over around the edges of the formed product body 21.

Also, in FIG. 7, the thicknesses of the decorative sheet 10 that has been stretched and attached are shown in percentages with the thickest portion thereof identified by 100%. As shown in FIG. 7, the decorative sheet 10 decreases its thickness from the center of the formed product 20 toward the edges thereof, and gets thinnest at the bent portion.

The weather resistance of the decorative sheet 10 becomes lowest at the thinnest portion. That is why sufficiently high weather resistance is preferably ensured even at the thinnest portion. For that reason, preferred embodiments of the present invention are effective particularly when a portion of the decorative sheet 10 is bent over around the edges of the formed product body 21 as shown in FIG. 7.

Also, preferred embodiments of the present invention are effective especially when the decorative sheet 10 has been stretched to a certain degree or more as a result of the forming process during the attachment. More specifically, preferred embodiments of the present invention are particularly applicable to a situation where the decorative sheet 10 attached includes a portion that is about 30% to about 50% as thick as the thickest portion thereof (e.g., the bent portion described above).

Figure 8:
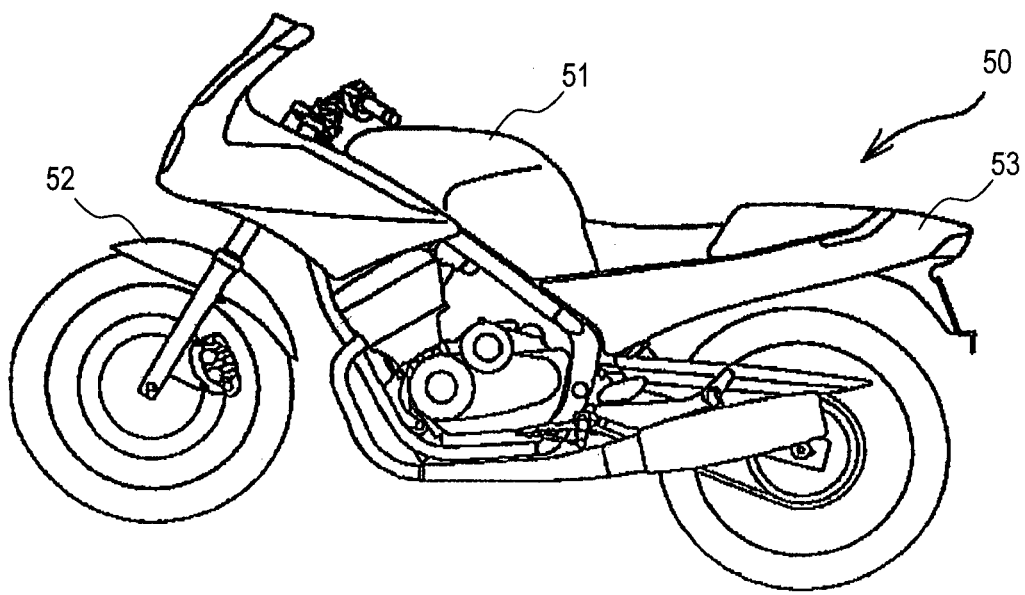
FIG. 8 is a side view schematically illustrating a motorcycle.
Figure 9:
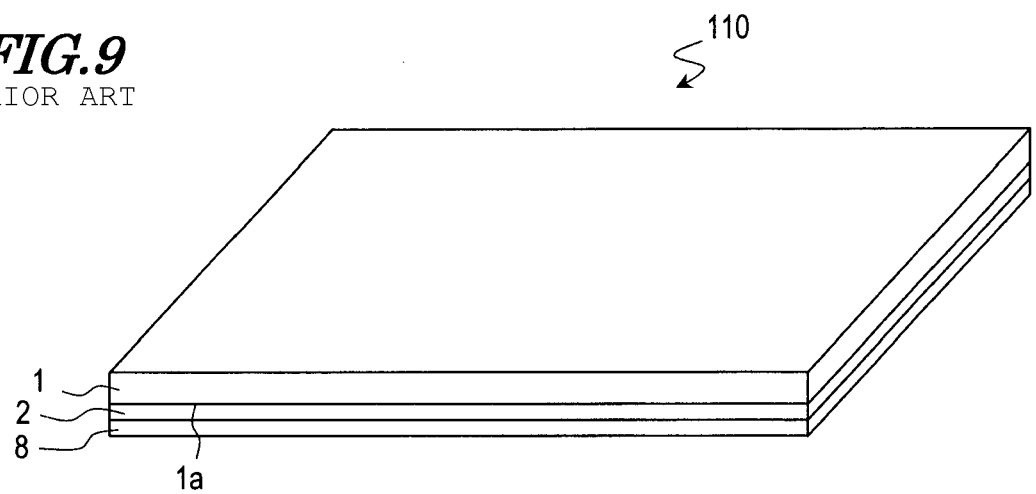
FIG. 9 is a perspective view schematically illustrating a conventional decorative sheet 110 for use to decorate a formed product.
Figure 10A:
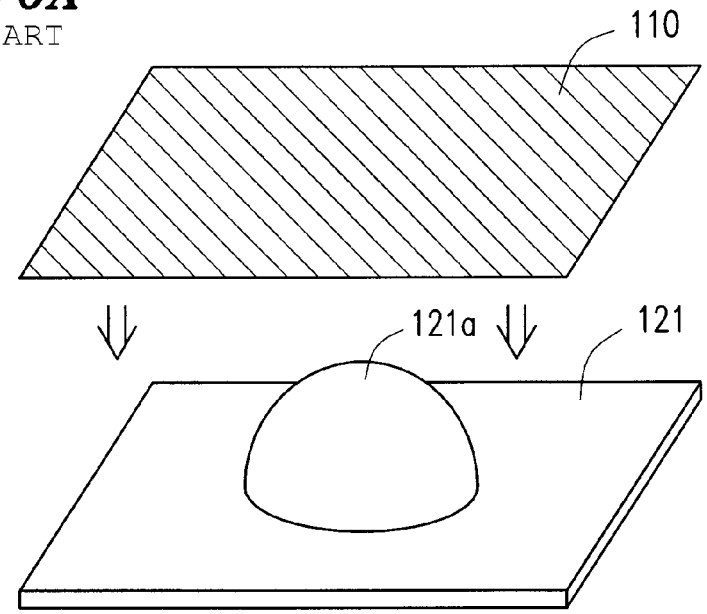
FIGS. 10A, 10B and 10C schematically illustrate a process of decorating a formed product with a decorative sheet.
Figure 10B:
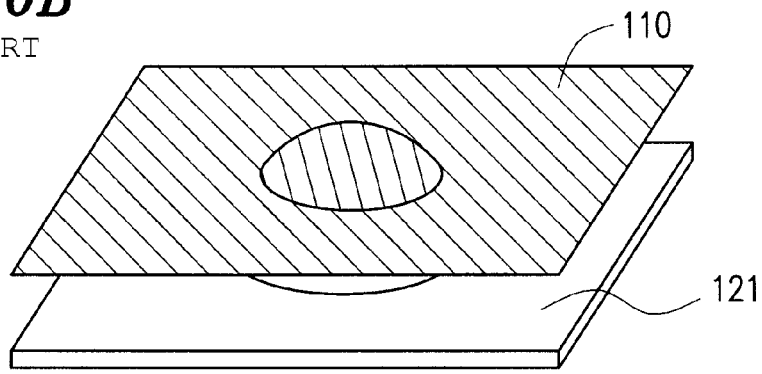
Figure 10C:
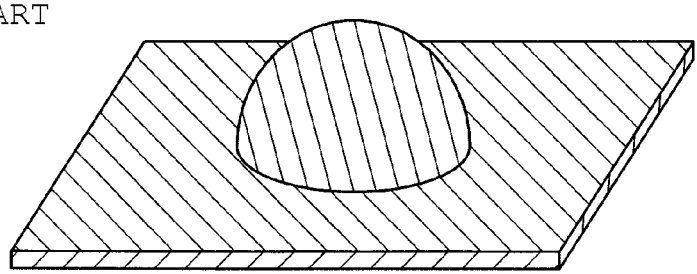
Figure 11:
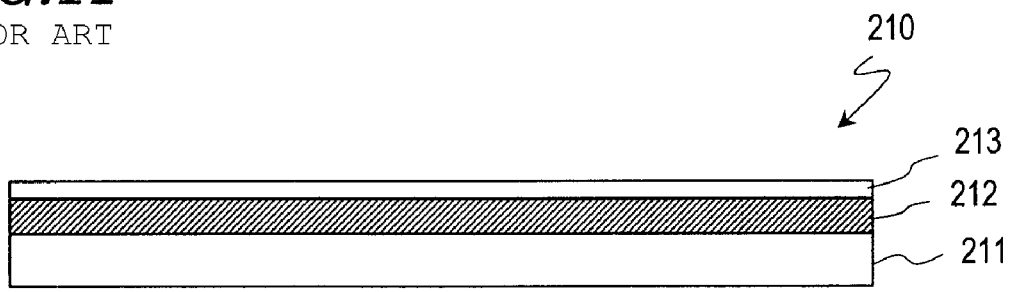
FIG. 11 is a cross-sectional view schematically illustrating a stack 210 of resin layers including an acrylic resin layer with a UV absorbent material.

A formed product decorated with the decorative sheet 10 of this preferred embodiment has such good weather resistance and such fine appearance that the product can be used effectively as an exterior member for various types of transportation apparatuses. For example, the formed product can be used effectively as the tank housing 51, the front fender 52 or the tail cowl 53 of a motorcycle 50 as shown in FIG. 8.

According to preferred embodiments of the present invention, the weather resistance of a decorative sheet, which should be attached onto the surface of a formed product while being stretched, can be increased sufficiently. In addition, it is also possible to prevent the sheet from cracking while the sheet is being attached.

A formed product decorated with the decorative sheet according to preferred embodiments of the present invention has such good weather resistance and such a fine appearance as to be used effectively as an exterior member for various types of transportation apparatuses including passenger cars, buses, trucks, motorcycles, tractors, airplanes, motorboats, and civil engineering vehicles.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2006-142072 filed on May 22, 2006, the entire contents of which are hereby incorporated by reference. Furthermore, the entire contents of Japanese Patent Application No. 2007-128803 filed on May 15, 2007, are hereby incorporated by reference.

What is claimed is:

1. A decorative sheet to be attached to a surface of an object, the decorative sheet comprising:
    a base member, which has first and second opposed principal surfaces;
    a protective layer, which is arranged over the first principal surface of the base member; and
    a coloring layer, which is arranged over the second principal surface of the base member and which includes a pigment; wherein
    the protective layer has a thickness of about 30 $\mu$m to about 60 $\mu$m and includes about 1.4 wt % to about 4.0 wt % of UV absorbent material;
    the coloring layer has a thickness of about 15 $\mu$m to about 80 $\mu$m and includes about 1.0 wt % to about 4.0 wt % of UV absorbent material; and
    the base member has a thickness of about 300 $\mu$m to about 800 $\mu$m.

2. The decorative sheet of claim 1, wherein the pencil hardness of the protective layer at room temperature is higher than that of the base member.

3. A formed product comprising a formed product body and the decorative sheet of claim 1 that has been attached to a surface of the formed product body.

4. The formed product of claim 3, wherein the decorative sheet is bent over edges of the formed product body to reach a back surface of the formed product body.

5. The formed product of claim 3, wherein a portion of the decorative sheet is about 30% to about 50% as thick as the thickest portion of the decorative sheet.

6. A motor vehicle comprising the formed product of claim 3.

* * * * *